(12) United States Patent
Hasenfratz et al.

(10) Patent No.: US 9,914,085 B2
(45) Date of Patent: Mar. 13, 2018

(54) FILTER ELEMENT AND FILTER SYSTEM

(71) Applicant: Mann+Hummel GMBH, Ludwigsburg (DE)

(72) Inventors: Robert Hasenfratz, Waiblingen (DE); Fabian Wagner, Moeglingen (DE); André Roesgen, Remshalden (DE); Christian Thalmann, Speyer (DE); Frank Pflueger, Sachsenheim (DE); Vit Wognar, Ivancice (CZ); Leos Burda, Domasov U Brna (CZ); Michal Tuma, Hlinsko v Cechach (CZ)

(73) Assignee: MANN+HUMMEL GmbH, Ludwigsburg (DE)

( * ) Notice: Subject to any disclaimer, the term of this patent is extended or adjusted under 35 U.S.C. 154(b) by 200 days.

(21) Appl. No.: 14/840,529

(22) Filed: Aug. 31, 2015

(65) Prior Publication Data

US 2016/0059174 A1   Mar. 3, 2016

(30) Foreign Application Priority Data

Aug. 29, 2014   (DE) .................. 10 2014 012 579

(51) Int. Cl.
  *B01D 46/24*   (2006.01)
  *B01D 46/00*   (2006.01)
  *F02M 35/024*  (2006.01)
  *F02M 35/02*   (2006.01)

(52) U.S. Cl.
  CPC ..... *B01D 46/2414* (2013.01); *B01D 46/0005* (2013.01); *B01D 46/0023* (2013.01); *B01D 46/0024* (2013.01); *F02M 35/0203* (2013.01); *F02M 35/02416* (2013.01); *F02M 35/02483* (2013.01); *B01D 2265/026* (2013.01); *B01D 2271/027* (2013.01)

(58) Field of Classification Search
  CPC ........... B01D 46/0005; B01D 46/0024; B01D 46/2414; B01D 2265/021; B01D 2265/06; B01D 2271/027; F02M 35/0203; F02M 35/02; F02M 35/02416; F02M 35/02483
  See application file for complete search history.

(56) References Cited

U.S. PATENT DOCUMENTS

| | | | |
|---|---|---|---|
| 2002/0112459 A1* | 8/2002 | Andress | B01D 46/0024 55/498 |
| 2013/0263744 A1 | 10/2013 | Osendorf et al. | |
| 2014/0102058 A1* | 4/2014 | Kaufmann | B01D 46/0004 55/482 |

FOREIGN PATENT DOCUMENTS

| | | |
|---|---|---|
| DE | 102004005210 A1 | 8/2005 |
| DE | 102012211185 A1 | 1/2014 |

* cited by examiner

Primary Examiner — Robert Clemente
(74) Attorney, Agent, or Firm — James Hasselbeck (57) ABSTRACT

The invention relates to a filter element (10), comprising a filter body (12) having a longitudinal axis (L) arranged between a clean side (50) and a crude side (52) of the filter element, as well as comprising at least one first end disk (16) arranged on an end face (15) of the filter body (12). The end disk (16) has a sealing arrangement (22) for forming a seal between the clean side (50) and the crude side (52). In addition, the sealing arrangement (22) has a sealing region (23) that forms a radial seal and a separate holding region (20) arranged concentrically with the sealing region (23) and acts as a radial floating bearing. The invention also relates to a filter system (100) for replaceable installation of such a filter element (10).

15 Claims, 5 Drawing Sheets

FILTER ELEMENT AND FILTER SYSTEM

TECHNICAL FIELD

The invention relates to a filter element having a sealing region and a holding region, in particular for use as an air filter for an internal combustion engine, as well as a filter system for installation of such a filter element.

BACKGROUND OF THE INVENTION

It is known that air filters may be used to filter combustion intake air for internal combustion engines in motor vehicles, for example, passenger vehicles, commercial vehicles, production machines, agricultural vehicles, but also stationary generators and the like. Such air filters usually comprise a housing, an air inlet and an air outlet, with a removable and replaceable main filter element situated in the housing. The housing often comprises a maintenance cover or access cover for access to the filter element accommodated in the interior for maintenance. The filter element may therefore be dismantled and either replaced by a brand-new filter element, overhauled and reused or exchanged with a used but overhauled filter element.

DE 20 2008 018 217 U1 describes an air filter system having an air filter housing and a serviceable air filter element. The serviceable air filter element is positioned, ready for operation, within a housing interior. The air filter element has a filter body extending between the first and second closing caps. The filter body surrounds and defines an open filter interior. The first closing cap is a closing cap that is open and has an air flow opening through it. The second closing cap is a closing cap that is closed and has an outer end surface. A housing sealing arrangement is provided on the first closing cap and is aligned to seal the air filter element with respect to the air filter housing and to hold it in the housing. A protruding/receiving arrangement is provided as an additional holding device, comprising first and second elements.

A first element of the protruding/receiving arrangement is positioned on the outer end surface of the second closing cap. It is to be brought into engagement with the access cover in a defined manner. A second element of the protruding/receiving arrangement is positioned on the access cover. It has a helical ring element and may be either a ring protrusion or a ring-shaped receiving groove. The first and second elements of the protruding/receiving arrangement engage with one another to supply a fixed holder of the air filter element on the second end. The first and second elements of the protruding/receiving arrangement are in non-rotatable engagement.

The filter elements of air filters are usually replaced after a certain period of operation. Depending on the amount of dust generated, the service life of an air filter may amount to a few days, for example, for use in construction machines, up to several months in environments with a lower dust burden.

In particular when filter elements are replaced frequently, secure and reliable sealing of the filter element in a housing is important. The sealing should be designed to be thermally stable and vibration-proof. Sealing of the filter element must also be ensured in installations or facilities exposed to extreme vibrations or shaking. At the same time, however, the filter element itself should preferably not have any metallic elements at all, so that it can be disposed of thermally with no problem.

BRIEF SUMMARY OF THE INVENTION

One object of the invention is therefore to create a filter element having a reliable seal between the region of the filtered fluid and the region of the unfiltered fluid, which will ensure a reliable seal, in particular when the filter element is replaced during maintenance.

Another object of the invention is to create a filter system for accommodating such a replaceable filter element with a reliable seal and secure mountability.

According to one aspect of the invention, the aforementioned objects are achieved by a filter element, comprising a filter body and at least one end disk, wherein the end disk has a sealing arrangement with a radial sealing region and a separate holding region that is arranged concentrically with the sealing region and acts as a radial floating bearing.

Advantageous embodiments and advantages of the invention are derived from the additional claims, the description and the drawings.

A filter element comprising a filter body having a longitudinal axis arranged between a clean side and a crude side of the filter element as well as at least one first end disk arranged on an end face of the filter body is proposed. The end disk has a sealing arrangement for forming a seal between the clean side and the crude side. In addition, the sealing arrangement has a sealing region that forms a seal radially and a separate holding region, which is arranged concentrically with the sealing region and functions as a radial floating bearing.

The filter element can be centered radially when installed into a housing and/or supported by means of the holding region. Due to the design of the holding region as a floating bearing, the filter element can also move axially in this bearing after being installed in the housing, so that manufacturing tolerances can be compensated, vibrations can have a less harmful effect on the filter medium and changes in length during operation due to uptake of water can also be compensated. Changes in length in the range of a few millimeters, for example, typically ±4 millimeters, can therefore be tolerable. The holding region may also be applied advantageously to an inner opposing surface of the housing wall and can thus also support it radially. The floating bearing extends in the radial direction and is preferably aligned in a plane with the sealing region, which is arranged concentrically therewith. The holding region is preferably situated outside of the sealing region in the radial direction, to thereby absorb the holding force for holding the filter element and keep it away from the sealing region, which is preferably situated inside of the holding region radially. The holding region and the sealing region are therefore arranged so that they are completely separate from one another in their functions. The seal can thus effectively and permanently exert its sealing function even under vibration loads. In particular the holding region may be a ring-shaped body arranged radially to the sealing region.

The sealing arrangement with the sealing region and the holding region may advantageously be arranged on an end face of the filter element, which at the same time is the outlet for the filtered fluid out of the inside region of the filter element on the clean side. With this end face, the filter element can be inserted first into the housing of a filter system, and thus when the sealing region is applied to the housing, the filter element can form a seal with respect to the crude side of the filter system. A floating bearing forms the application of the holding region to the housing. The second end face of the filter element may in this case have an end disk, which represents a fixed bearing when the housing is closed by means of a lid and preferably also provides a seal from the clean side to the crude side of the filter element with respect to the housing. In an alternative embodiment, however, the end face of the filter element on the outlet end may also represent a fixed bearing, and the opposing end face, which is in contact with the inside of a lid, for example, may have a sealing region according to the invention and a holding region and may thus represent a radial floating bearing. In an alternative embodiment, it is also conceivable for a sealing region according to the invention and a holding region according to the invention to be situated on opposite end faces of the filter element.

The separation of the functions of the sealing region and the holding region by means of a sealing/holding geometry into strictly sealing, on the one hand, and strictly holding, on the other hand, in contrast with the use of end disks made of polyurethane foam, in which the functions of sealing and holding are usually combined, has the advantage that it effectively relieves the burden on the seal of the filter element and also the two functions can be embodied advantageously through the possibility of a choice of different materials. Even if the sealing lip geometry of the seal should be in contact with the stop, the path of vibrations can be limited by the holding elements of the holding region. In addition, a positional orientation can be achieved on installation in that positioning aids, which are arranged coaxially around the holding region, for example, are provided, e.g., in the form of straps or nubs or the like extending radially.

The sealing region may advantageously have a peripheral seal, comprising at least one sealing lip, so that on installation in a housing, the clean side of the filter element can be sealed with respect to the crude side. Reliable sealing between the region in which the unfiltered fluid flows and the region in which the filtered fluid flows is a fundamental prerequisite for a functioning filter system. The application of a plurality of sealing lips at intervals in the millimeter range is expedient for ensuring a particularly reliable seal. Typically three sealing lips in the form of a three-chamber seal, for example, can be selected. The seal may be facing radially inward as well as radially outward and depends only on the arrangement of a sealing surface on the housing wall.

In an advantageous embodiment, the holding region may have at least one holding element. With one end region, the filter element is opposite the outlet region of the fluid on the clean side, for example, and is fixedly supported in the housing. The holding region serves to secure the filter element in the housing on the other end and to hold it during operation, so that length tolerances and extension of the length due to uptake of moisture, for example, can be compensated. When the holding region is formed by a collar, for example, arranged centrally around the longitudinal axis, the holding element can expediently be applied to the collar at the surface on the outside in the radial direction and may be in contact with an opposing surface on the housing wall of the filter system. Thus, for example, a flat plastic element a few millimeters thick is preferably suitable as the holding element. The actual holding function is advantageously performed by the holding element itself.

A damping function may preferably be represented by at least one buffer element. Damping of the holding of the filter element in the housing is advantageous because vibrations can occur during operation of the filter system, in particular on an internal combustion engine and most especially during operation in a vehicle. Such vibrations can result in premature wear on the filter element and/or failure of the sealing effect of the seal of the filter element.

The at least one buffer element may advantageously be arranged on the surface of the at least one holding element facing in the radial direction. The buffer element can manifest its damping function between the holding element and an opposing surface of the housing wall and can effectively protect the filter element from damage due to vibration. The buffer element can advantageously be designed so that it can hold filter element masses, which can typically be up to 8 kg when holding as much as 5 kg dirt, and can dampen vibrations, which typically amount to 5 times the acceleration due to gravity in the area of a vehicle, and may amount to as much as 10 times the acceleration due to gravity during peaks. In this way, when applied to a housing part such as an opposing surface of the housing wall, the buffer element can manifest its damping effect and thus effectively protect the filter element from vibrations.

The holding elements may also serve to pre-affix the filter element in the housing to greatly simplify the assembly process, such as the insertion of the filter element into the housing, wherein forces in the range between 4 and 5 kilonewtons may occur.

The holding region and/or the sealing region may preferably be designed to be concentric around the longitudinal axis. The holding force can thus be distributed symmetrically to the filter element, which promotes the longevity of the filter system. The sealing region is therefore advantageously loaded symmetrically and can carry out its sealing function for as long as possible. In this way, the holding region, which may be arranged on the outside of the end disk in the radial direction, can advantageously absorb the holding forces and thus relieve the burden of these holding forces on the seal, which in turn promotes the imperviousness and longevity of the filter system.

The holding region may expediently be designed to be interrupted in segments. This makes it possible to save on material, which can reduce the cost of manufacturing as well as the weight of the filter element. In addition, pre-centering is possible during installation in the housing by means of a holding region that is interrupted in segments, and this serves to increase reliability in mounting, because it is possible to mount the individual segments of different lengths and not symmetrical with the longitudinal axis.

The holding region may advantageously have holding elements with different dimensions in the axial and/or radial and/or tangential directions. Various geometries, such as lengths in the design of the holding elements make it possible to ensure a unique position of the filter element in mounting in the housing, so that, according to the poka-yoke principle, the filter element also cannot be installed in the wrong position.

Furthermore, with a unique and always constant position of the filter element in the housing, the flow conditions are always reproducibly adjustable in a filter system, which is of great importance for the quality of a measurement with air flow sensors, for example, such as hot-film air flow meters (HFM sensors) known from the passenger vehicle field.

The at least one end disk as well as the holding element may advantageously be made of a hard plastic, and the buffer element and the seal may be made of an elastomer. In this way, the holding function can be represented via the relatively hard elements, while softer materials are advantageous for the buffering and damping functions. Typically polypropylene, polyamide, polyethylene, preferably glass fiber-reinforced, typically with a glass fiber content of up to 20 to 30 vol %, may be used as the hard plastics. Thermoplastic elastomers are usually used as the elastomers. Polyurethane materials may also be used advantageously. The seals on the filter element are expediently made of elastomers. The end disks are expediently connected to the filter body by a mirror welding method.

It is also advantageous if the sealing region shows a linear increase in force with an increase in pressing force, so that tolerances can be compensated and a reliable sealing effect is ensured in the long run. Typical tolerance values here are in the millimeter range.

However, the holding region may advantageously have a progressive gradient of its holding force. The opposing force therefore increases disproportionately with an increase in the deflection out of the resting position due to the holding elements. In this way, the burden on the sealing region is relieved in its tolerance end positions and the sealing region is not subjected to a load beyond the stop.

In an alternative embodiment, the holding elements may additionally be supported axially on an inner housing contour, so that the filter element therefore experiences an additional axial support in vibrations and can better absorb vibrations. Such an arrangement may be advantageous in particular when using relatively soft damping materials for the holding elements.

In an advantageous embodiment, the filter body may consist of filter bellows folded in a zigzag pattern (pleated) and designed to form a closed ring. The pleating can be produced, for example, by knife pleating, for longer filter bodies, or by rotary pleating. The filter bellows may be made of paper or cellulose or a fiber blend of plastic and cellulose. The filter bellows may have a smooth surface, rolled and/or designed in various embossed forms for reinforcement and/or to create hollow spaces for deposition of dust. The filter bellows may have a coating and/or impregnation to repel moisture. Alternatively, the bellows may also be coated with nanofibers. Use of these materials as the filter medium constitutes a very economical option for implementing such a filter element. At the same time, the shape described here offers a stable arrangement, so that a self-supporting design of the filter body and thus a favorable installation property are provided.

The filter element may expediently be used as an air filter, in particular as an air filter for an internal combustion engine. Reliable operation of internal combustion engines is also based on a secure and advantageous filtering of the intake air for combustion operation. The filter element described here thus constitutes an economical option.

Use of the filter element as a particle filter is also advantageous, in particular as a particle filter for an internal combustion engine. Here again, reliable assembly and economical replaceability of the described filter element are of crucial importance.

According to another aspect, the invention relates to a filter system having a filter element comprising a housing with a housing wall and a lid, wherein the housing wall has an opposing surface on its inside in the radial direction. In addition, the filter system comprises an inlet arranged on the housing for supplying the fluid to be filtered, in particular air, as well as an outlet arranged on the housing for discharging the filtered fluid. The filter element here comprises a filter body, which has a longitudinal axis and is arranged between a clean side and a crude side; it also comprises at least one first end disk arranged on an end face of the filter body, wherein the end disk has a sealing arrangement for forming a seal between the clean side and the crude side. In addition, the sealing arrangement has a sealing region, which forms a radial seal and a separate holding region, which acts as a radial floating bearing and is arranged concentrically with the sealing region, such that holding elements arranged on the holding region can be supported radially in contact with the opposing surface of the housing wall. A seal arranged on the sealing region forms a seal radially between the clean side and the crude side, and can be applied to the sealing surface of the housing wall. Furthermore, the filter element is arranged replaceably in the housing of the filter system.

The essential advantage of such a filter system lies in the reliable and stable assembly of the filter element as well as a very economical replaceability of the filter element in a service incident. Rapid replaceability is of great importance in particular with short service lifetimes, such as those that may occur in conjunction with use in agricultural machines and construction machines.

According to another embodiment of the invention, a secondary element may be arranged on the clean side of the filter element. The secondary element, which may consist of a load-bearing structure lined with a permeable filter medium, for example, a nonwoven, has the task of keeping the outlet of the filter element closed when the filter element is replaced, so that no dirt can penetrate into this region while the filter element is being cleaned or replaced. In a preferred embodiment, the secondary element is connected to the housing by a screw connection and is provided with a seal with respect to the housing.

BRIEF DESCRIPTION OF THE DRAWINGS

Additional advantages are derived from the following description of drawings. The drawings show exemplary embodiments of the invention. The drawings, the description and the claims contain numerous features in combination. The skilled person will expediently also consider the features individually and combine them into reasonable additional combinations.

They show by way of example.

DETAILED DESCRIPTION OF THE INVENTION

In the figures, the same or similar components are labeled with the same reference numerals. The figures show only examples and are not to be understood as being restrictive.

Figure 1:
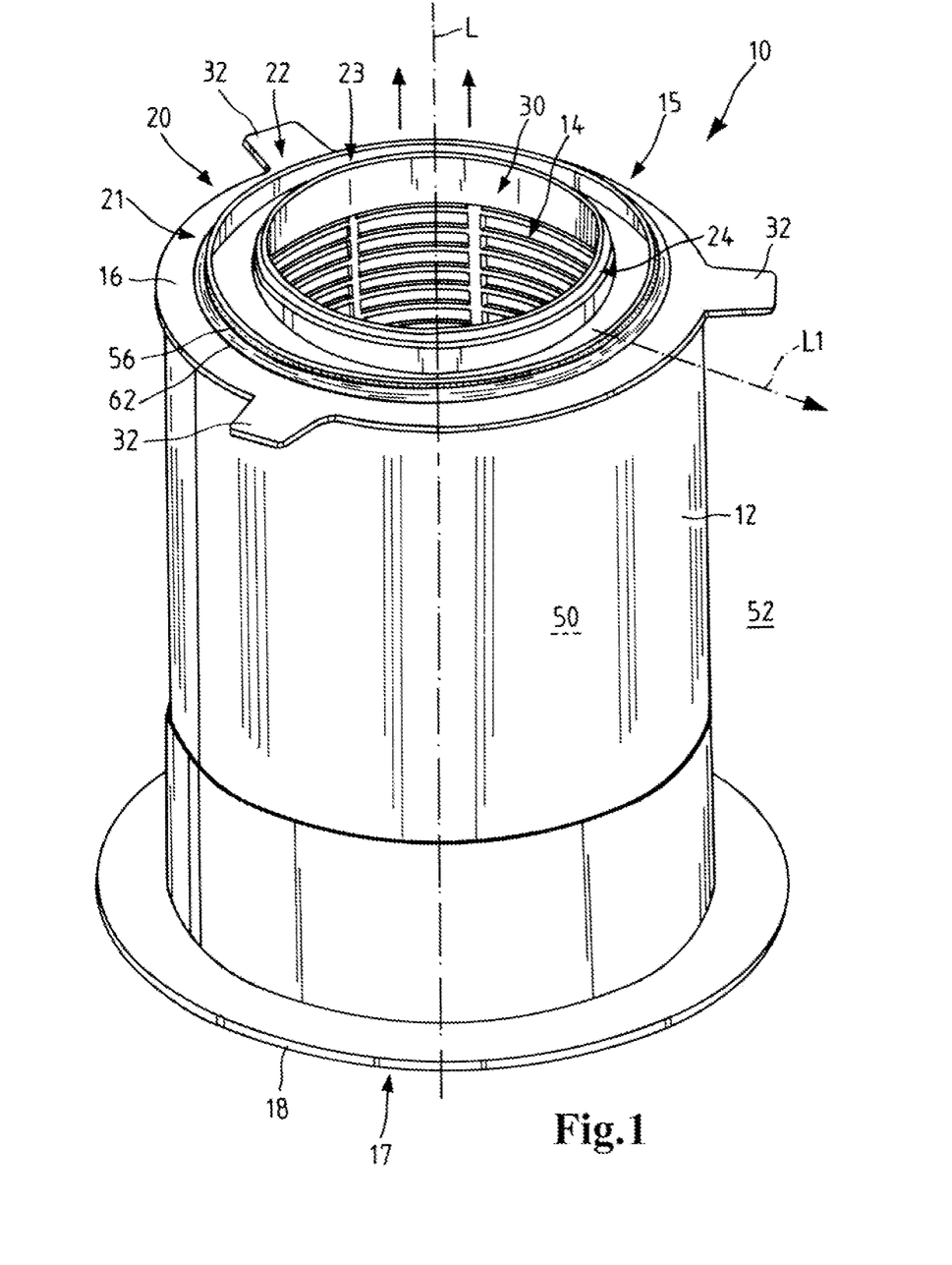
FIG. 1 a perspective view of a filter element according to one exemplary embodiment of the invention with a view of the sealing arrangement.
Figure 4:
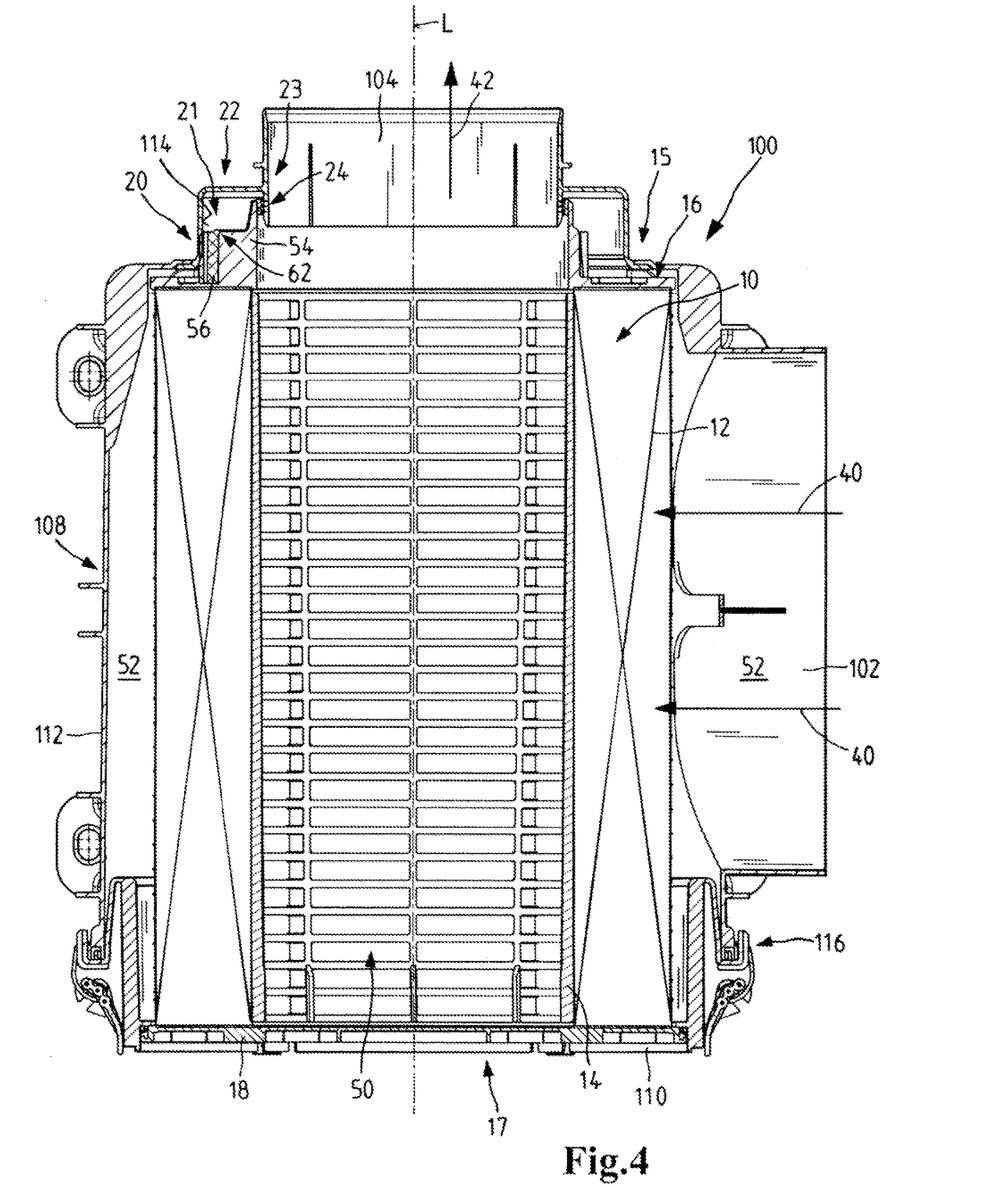
FIG. 4 a longitudinal section through a filter system according to an exemplary embodiment of the invention.

FIG. 1 shows a perspective view of a filter element 10 according to one exemplary embodiment of the invention. This shows a round filter element 10, whose filter body 12 has a longitudinal axis L, is arranged between a clean side 50 and a crude side 52 of the filter element 10 and is sealed on both end faces 15, 127 by the end disks 16, 18. A fluid, in particular air, is provided to flow through the filter body 12 radially from the outside to the inside, wherein the outlet of the filtered fluid is provided above the upper end disk 16, which has a central outlet opening 30 for this purpose. The filter element 10 can be clamped in a fixedly supported manner by means of the end disk 18 via the lid 110 in the housing 108 of a filter system 100 (see FIG. 4). At the upper end, the filter body 12 is sealed by the end disk 16, which has an outlet opening 30 for discharge of the filtered fluid and is therefore sealed with respect to the housing 108 (FIG. 4). The end disk 16 has a sealing arrangement 22 for sealing between the clean side 50 and the crude side 52 of the filter element 10, wherein the sealing arrangement 22 has a sealing region 23, which forms a radial seal, and a separate holding region 20, which acts as a floating bearing arranged concentrically with the sealing region 23 and extending in the radial direction. The sealing region 23 has a peripheral seal 24, comprising at least one sealing lip 25, preferably three sealing lips 25, so that, when installed in a housing 108, the clean side 50 of the filter element 10 can be sealed with respect to the crude side 52. The holding region 20 has a plurality of holding elements 21 with buffer elements 56. The buffer elements 56 are arranged on free surfaces 62 of the holding elements 21 facing in the radial direction L1. In the exemplary embodiment shown in FIG. 1, the end disk 16 also has three positioning aids 32 extending radially outward in the form of straps, which a permit a position-oriented installation of the filter element 10 in the housing 108.

The end disk 16 as well as the holding element 21 may expediently be made of a hard plastic, and the buffer elements 56 as well as the seal 24 may be made of an elastomer. The sealing region 23 may have a linear increase in force with an increase in the pressing force, while the holding region 20 may have a progressive increase in its holding force, so that the seal 24 is advantageously relieved of the burden by the holding region when the sealing lips come in contact with the stop due to vibrations or tolerance positions.

Figure 2:
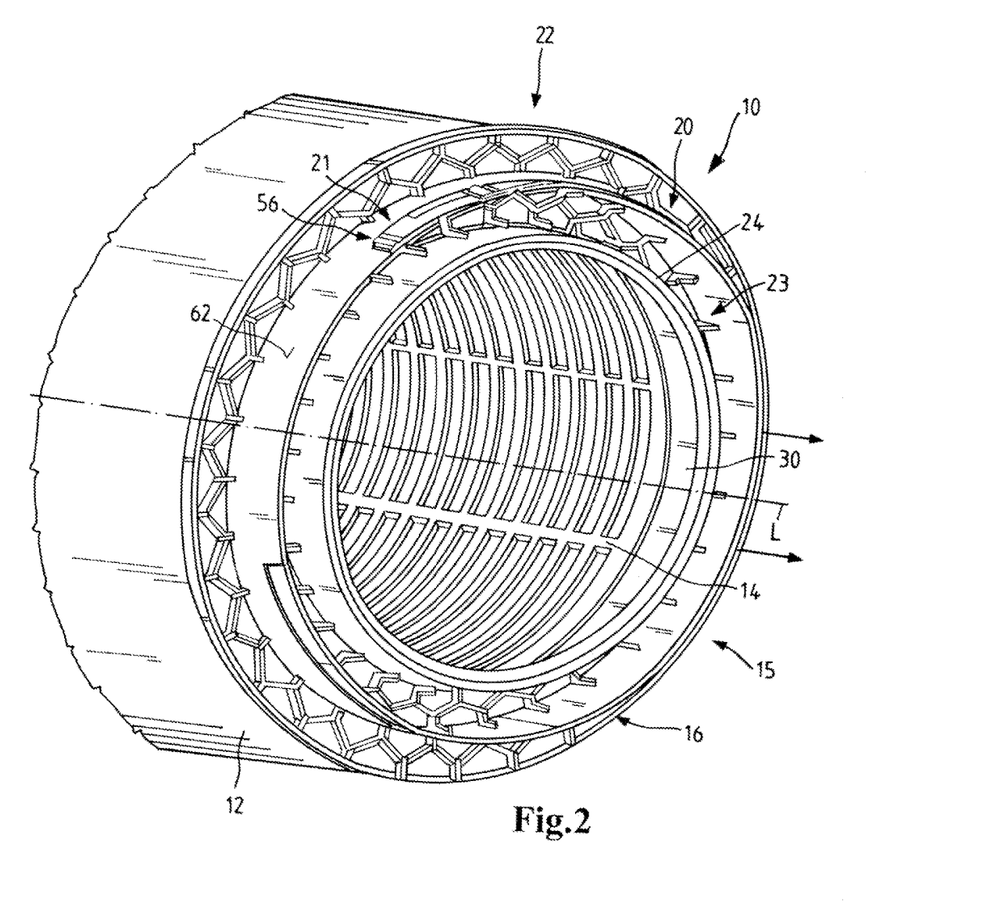
FIG. 2 a perspective view of a sealing arrangement according to one exemplary embodiment of the invention.

FIG. 2 shows a perspective view of a sealing arrangement 22 according to one exemplary embodiment of the invention. The holding region 20 and the sealing region 23 are each designed as an axial collar on the end disk concentrically around the longitudinal axis L and the outlet opening 30. The holding region 20 has holding elements on the surface, which is on the outside in the radial direction, these holding elements 21 also being provided with a plurality of buffer elements 56 in an area 62 facing in a radial direction. The holding elements 21 may be in contact with an opposing surface 114 in the housing of a filter system 100 and can thereby affix the filter element 10 radially. Effective damping of vibrations on the filter system 100 can be achieved by means of the buffer elements 56.

However, the holding region 20 may also be designed to be interrupted in segments to thereby reduce the cost of manufacturing and/or the weight. Furthermore, in conjunction with holding elements 21 with different dimensions in the axial and/or radial and/or tangential directions, pre-centering can thus be achieved by the poka-yoke principle for facilitated installation in a housing 108 as well as an unambiguous installation position and non-replaceability in the housing 108 of a filter system 100.

The sealing region 23 of the sealing arrangement 22, which is designed as a central collar around the outlet opening 30, has the seal 24 on its free end facing radially inward.

Figure 3:
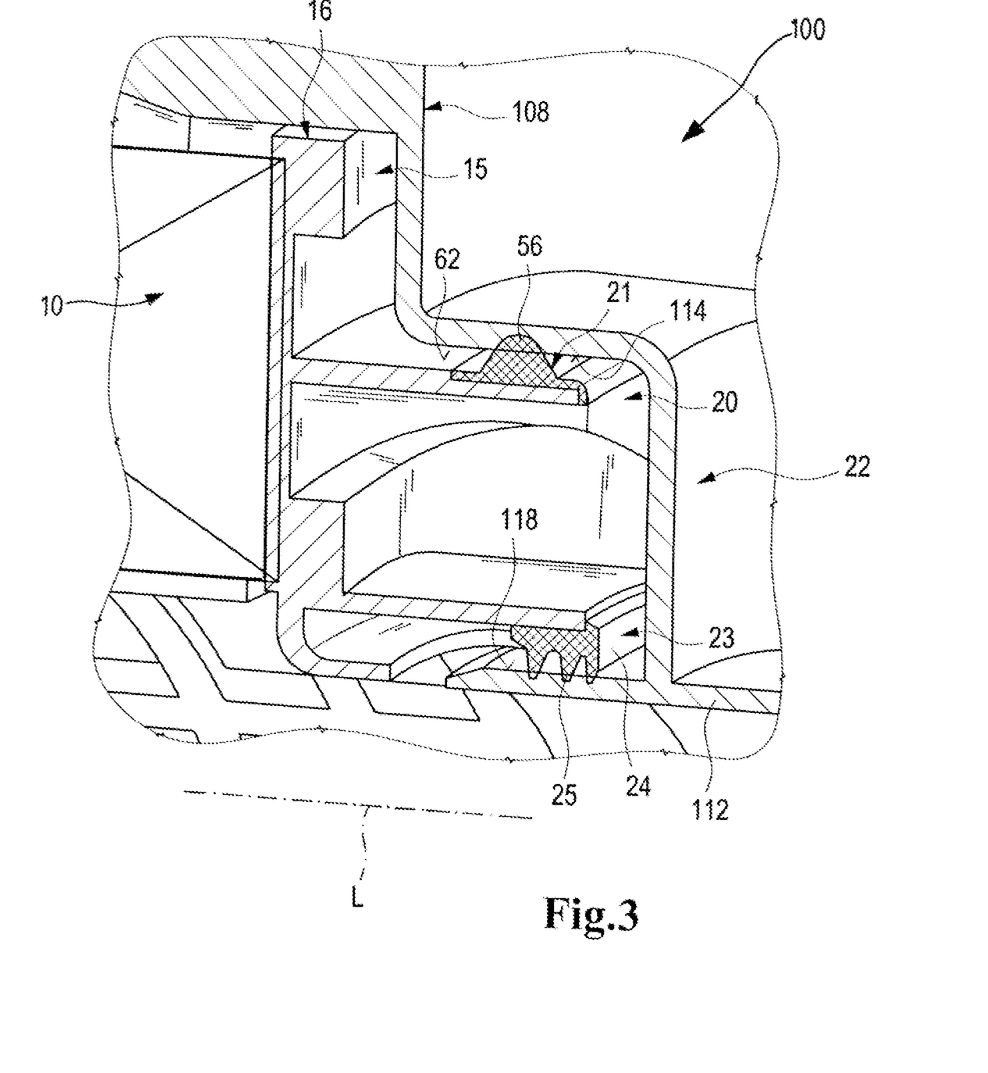
FIG. 3 a detail of a section through a filter system, including a diagram of the interaction of the retaining element and the second seal with the housing wall according to one exemplary embodiment of the invention.

FIG. 3 shows a detail of a section through a filter system 100 with a view of the interaction of the holding element 21 and the seal 24 with the housing wall 112 according to one exemplary embodiment of the invention. The filter element 10 is in contact with the opposing surface 114 of the housing wall 112 via the holding element 21 and the buffer element 56. The floating bearing allows movement of the holding elements 21 with the buffer elements 56 in the axial direction L along the opposing surface 114. The seal 24, which protrudes radially inward with its three sealing lips 25 in this exemplary embodiment, is in contact with the sealing surface 118 of the housing wall 112 and thus seals it. It can be seen that the housing wall 112 penetrates through the buffer element 56 as an artifact of the CAD representation. In reality, the buffer element 56 is pressed against the opposing surface 114 of the housing wall 112 and can thus exert its damping function.

FIG. 4 shows a longitudinal section through a filter system 100 according to one exemplary embodiment of the invention. A filter element 10 is mounted in the housing 108, which consists of the housing wall 112 and lid 110. The filter element 10 is inserted into the housing wall 112 until, with the end disk 16, it has reached its seat with the floating bearing on the outlet end 104 of the housing wall 112. Then the lid 110 is placed on the housing wall 112 and the end disk 18, wherein the end disk 18 is fixedly supported in the lid 110. The housing 108 is fixedly sealed with the lid 110 by means of strap closures 116, which can be placed on the housing wall 112. By closing the lid 110, the filter element 10 is pressed into its seat on the housing side, is fixedly braced radially via the holding region 20 and is sealed radially to the housing 110 via the sealing region 23 of the sealing arrangement 22. The seal 24 seals the clean side 50 with respect to the crude side 52.

The design of the filter element 10 is described as shown in FIG. 1. The inner structure of the filter element 10 can be seen in the sectional view. It comprises a filter body 12 in the form of a hollow cylinder as well as a supporting pipe 14 for reinforcing the filter body 12. The space inside the filter body 12 is the clean side 50 because the fluid path 40, 42 of the fluid to be filtered goes radially from the outside to the inside through the inlet 102 into the housing 108 and radially from the outside to the inside through the filter body 12, while the outside of the filter body 12 embodies the crude side 52.

A secondary element 28 (not shown), consisting essentially of a load-bearing structure with a relatively permeable filter medium, for example, a nonwoven, may be mounted on the clean side 50 of the filter element 10 inside the supporting pipe 14. When the filter element 10 is replaced in the housing 108, this secondary element may remain in place to protect the further air guidance, for example, in an internal combustion engine, with respect to the penetration of dust particles and other objects. The secondary element 28 may be screwed tightly onto the outlet part of the housing 108 by means of screw connections or snap connections, for example.

Figure 5:
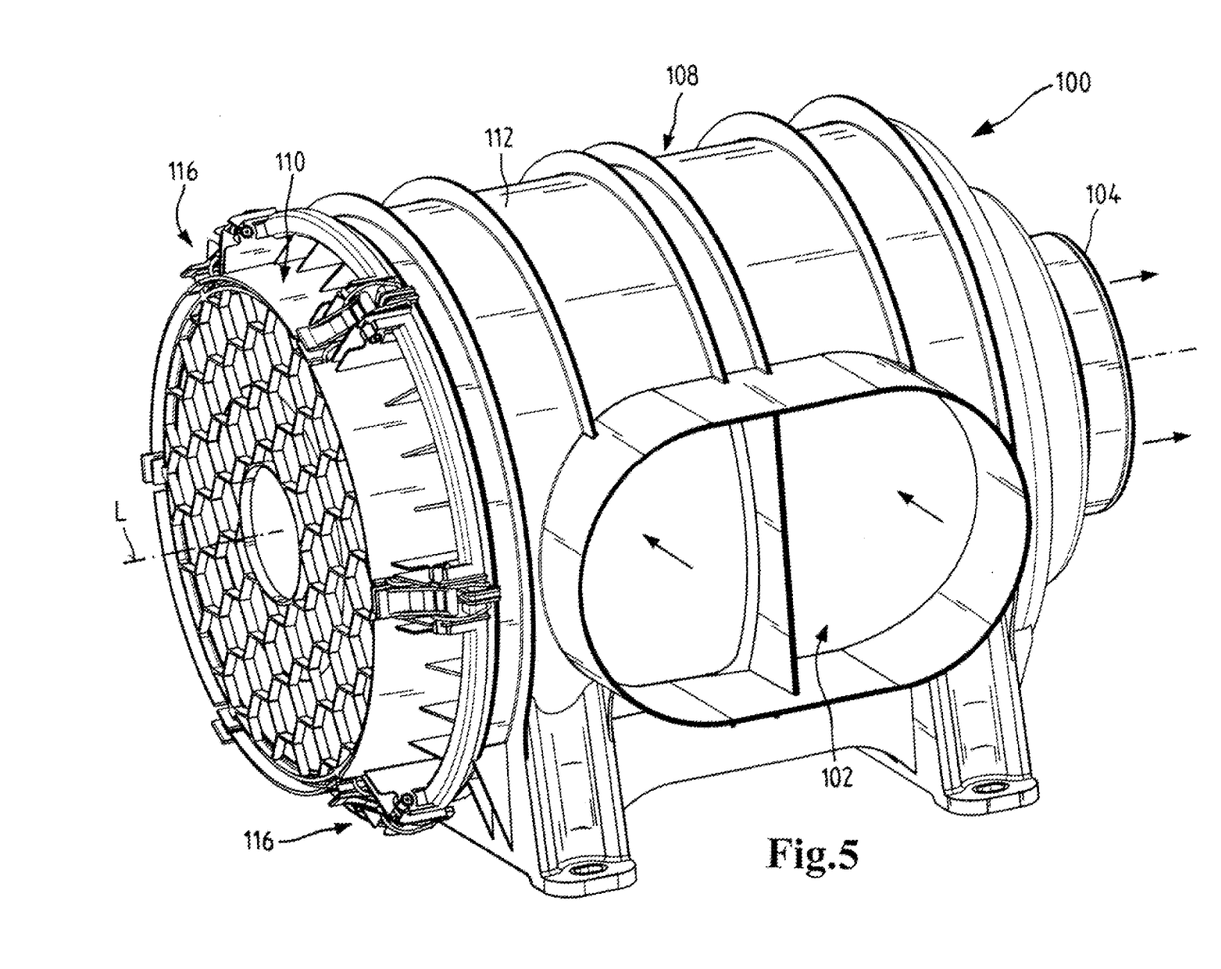
FIG. 5 a perspective view of a filter system according to an exemplary embodiment of the invention with a tangential inlet and a central outlet.

FIG. 5 shows a perspective view of a filter system 100 according to the exemplary embodiment of the invention with a tangential inlet 102 and a central outlet 104 on a housing end face. This shows a round filter design, consisting of a housing 108, which is sealed with a lid 110 by means of strap closures, for example.

When used as an air filter system, dust-laden air flows into the inlet 102, which is arranged tangentially to an air filter element installed on the inside, so that the air in the interior of the housing 108 is induced to a rotational movement by oncoming flow protection on the filter element. The filter element and the oncoming flow protection are not shown in the drawing. The purified air can be discharged from the housing 108 through the central outlet 104.

The filter element 10 may be used as an air filter, in particular as an air filter for an internal combustion engine. In principle, however, it is also conceivable to use it as a particle filter in a similar design.

What is claimed is:

1. A filter element (10), comprising
a filter body having a longitudinal axis (L), the filter body arranged between a clean side and a crude side of the filter element;
an end disk arranged on an end face of the filter body, the end disk forming:
   a first axial collar projecting axially outwardly from an outer face of the end disk;
   a second axial collar projecting axially outwardly from the outer face of the end disk;
   wherein first and second axial collars are spaced radially apart and are arranged concentrically around the longitudinal axis L;
wherein the first axial collar and the second axial collar of the end disk are components of a sealing arrangement for forming a seal between the clean side and the crude side;
wherein the sealing arrangement (22) has
   a sealing region on the first axial collar of the end disk that forms a seal radially and
   a separate holding region on the second axial collar of the end disk, which is arranged concentrically with the sealing region and acts as a radial floating bearing.

2. The filter element according to claim 1, wherein the sealing region has a circumferential seal, comprising at least one sealing lip, operable such that on installation in a housing, the clean side of the filter element can be sealed with respect to the crude side.

3. The filter element according to claim 1, wherein the holding region has at least one holding element.

4. The filter element according to claim 3, wherein the at least one holding element has at least one buffer element.

5. The filter element according to claim 4, wherein the at least one buffer element is arranged in an area facing in the radial direction and belonging to the at least one holding element.

6. The filter element according to claim 5, wherein the end disk and the holding element are made of a hard plastic; and
wherein the at least one buffer element and the seal are made of an elastomer.

7. The filter element according to claim 1, wherein the holding region and/or the sealing region is designed as concentric around the longitudinal axis (L).

8. The filter element according to claim 1, wherein the holding region is interrupted in segments.

9. The filter element according to claim 1, wherein the sealing region has a linear increase in force with an increase in the pressing force.

10. The filter element according to claim 1, wherein the holding region has a progressive increase in its holding force.

11. The filter element according to claim 1, wherein the filter element is configured and operable as an air filter for an internal combustion engine.

12. The filter element according to claim 1, wherein the filter element is configured and operable as a particle filter for an internal combustion engine.

13. A filter element, comprising:
a filter body having a longitudinal axis (L), the filter body arranged between a clean side and a crude side of the filter element;
at least one first end disk arranged on an end face of the filter body;
wherein the end disk has a sealing arrangement for forming a seal between the clean side and the crude side;
wherein the sealing arrangement has a sealing region that forms a seal radially and a separate holding region, which is arranged concentrically with the sealing region and acts as a radial floating bearing;
wherein the holding region has holding elements each having different dimensions in the axial and/or radial and/or tangential directions relative to remaining holding elements.

14. A filter system, comprising:
a housing (108) including:
   a housing wall and a lid;
   wherein the housing wall has an opposing surface on its inside in the radial direction;
   wherein the housing wall has a sealing surface on its inside in the radial direction;
   an inlet arranged on the housing supplying the fluid to be filtered;
   an outlet arranged on the housing discharging the filtered fluid;
a filter element including:
   a filter body with a longitudinal axis (L) that is arranged between a clean side and a crude side;
   an end disk arranged on an end face of the filter body, the end disk forming:
   a first axial collar projecting axially outwardly from an outer face of the end disk;
   a second axial collar projecting axially outwardly from the outer face of the end disk;
   wherein first and second axial collars are spaced radially apart and are arranged concentrically around the longitudinal axis L;
   wherein the first axial collar and the second axial collar of the end disk are components of a sealing arrangement for forming a seal between the clean side and the crude side;
   wherein the sealing arrangement has
      a radial sealing region on the first axial collar of the end disk that forms a seal; and
      a separate holding region on the second axial collar of the end disk, which is arranged concentrically with the sealing region and acting as a radial floating bearing;
   wherein holding elements arranged on the holding region can be supported radially in contact with the opposing surface of the housing wall;
   wherein a seal arranged on the sealing region forms a seal on the sealing surface of the housing wall, wherein it can be applied radially between the clean side and the crude;
   wherein the filter element is arranged so that it can be replaced in the housing of the filter system.

15. The filter system according to claim 14, wherein a secondary element is arranged in the housing on the clean side.

* * * * *